United States Patent [19]

Ikeda et al.

[11] Patent Number: 4,960,548

[45] Date of Patent: Oct. 2, 1990

[54] METHOD OF MANUFACTURING MOLDED WOODEN PRODUCT

[75] Inventors: Sadao Ikeda; Yoshio Taguchi, both of Toyota, Japan

[73] Assignee: Toyota Jidosha Kabushiki Kaisha, Toyota, Japan

[21] Appl. No.: 328,818

[22] Filed: Mar. 24, 1989

Related U.S. Application Data

[63] Continuation of Ser. No. 79,020, Jul. 29, 1987, abandoned.

[30] Foreign Application Priority Data

Aug. 6, 1986 [JP] Japan ............................... 61-184774

[51] Int. Cl.[5] ...................... B01D 45/02; B29C 43/02

[52] U.S. Cl. ............................... 264/40.4; 209/139.1; 264/118; 264/119

[58] Field of Search ...................... 264/40.4, 40.7, 518, 264/118, 119, 121, 138, 162, 163, 294, 296; 209/139.1, 138

[56] References Cited

U.S. PATENT DOCUMENTS

| | | | |
|---|---|---|---|
| 2,822,028 | 2/1958 | Himmelheber et al. | 264/40.4 |
| 3,308,089 | 3/1967 | Van Elten | 264/40.4 |
| 3,341,009 | 9/1967 | Bennett et al. | 209/139.1 |
| 3,354,248 | 11/1967 | Haas et al. | 264/120 |
| 4,010,096 | 3/1977 | Murray et al. | 209/139.1 |
| 4,155,968 | 5/1979 | Yamamoto et al. | 264/40.4 |
| 4,218,414 | 8/1980 | Hagg et al. | 264/40.4 |
| 4,557,882 | 12/1985 | Arnold | 264/40.4 |
| 4,559,194 | 12/1985 | Hegenstaller | 264/120 |

FOREIGN PATENT DOCUMENTS

| | | | |
|---|---|---|---|
| 43779 | 4/1978 | Japan . | |
| 124081 | 9/1979 | Japan . | |
| 9480 | 1/1981 | Japan . | |
| 259372 | 12/1985 | Japan . | |
| 90203 | 4/1987 | Japan . | |
| 904807 | 2/1982 | U.S.S.R. | 209/139.1 |

*Primary Examiner*—Mary Lynn Fertig Theisen
*Attorney, Agent, or Firm*—Finnegan, Henderson, Farabow, Garrett and Dunner

[57] ABSTRACT

A method of manufacturing a molded wooden product includes the steps of: preparing a ligneous molding material by adding a binder essentially consisting of a synthetic resin and the like to wood fibers; adjusting the weight of the molding material in a fibrous state or in a state of being aggregated into a predetermined configuration; directly supplying the molding material to a shaping mold; shaping the outer periphery of the molding material by moving the shaping mold toward the center in conformity with the final external shape of a molded product; and hot compression molding the molding material, thereby obtaining a molded wooden product of a predetermined configuration.

3 Claims, 9 Drawing Sheets

METHOD OF MANUFACTURING MOLDED WOODEN PRODUCT

This application is a continuation of application Ser. No. 079,020, filed July 29, 1987, now abandoned.

BACKGROUND OF THE INVENTION

1. Field of the Invention

The present invention relates to a method of manufacturing a molded wooden product by hot compression molding a ligneous molding material which is composed of wooden fibers with a binder consisting of a synthetic resin, etc. added thereto and which has been supplied to a mold.

2. Description of the Prior Art

Since such molded wooden products are lighter than plywoods, have high heat resistance, water resistance and moisture resistance, and are strong for their thickness, they have found extensive utility as what is called a hardboard in applications including interior materials used in buildings, articles of furniture, interior materials used in automobiles, and cabinets for television and stereo sets.

Heretofore, such molded wooden products have generally been manufactured by the following procedure. Wood chips are digested with steam and disintegrated. A binder such as a phenol resin, hemp fibers, a water-repelling agent such as rosin and paraffin, etc. are mixed with the thus-obtained wooden fibers. These wood fibers are formed into a stack of an appropriate thickness, and then lightly hot compression molded into what is called a molding mat (10 to 40 mm in thickness) with, for example, a roll press, and the mat is appropriately cut to be supplied to a shaping mold, where the mat is hot compression molded into a predetermined configuration.

The above-described manufacturing method, however, is disadvantageous in that since it necessitates the step of forming a molding material into a mat (hereinunder referred to as "mat-making"), the procedure becomes complicated, thereby making it difficult to enhance the productivity as expected, and in that since the step of cutting the mat into an appropriate size for a shaping mold is essential, the yield is lowered by that degree, thereby raising the manufacturing cost as a whole.

In addition, if a large plate body having a deeply drawn portion is formed from a single mat, the corner portions become thin-walled because it is difficult for the mat material (wood fibers) to flow into the deeply drawn portion, often resulting in production of a large cavity or a crack. As a countermeasure, the amount of hemp fibers used may be increased. In this case, however, it is necessary to add an extra amount of synthetic resin, which leads to a an in the raw material cost and, hence, rise increase in the cost of the product.

To solve the above-described problems caused by the use of a mat for molding, the present inventors proposed a method of manufacturing a molded wooden product by hot compression molding a ligneous molding material which has been supplied into a shaping mold after being aggregated into a predetermined configuration (Japanese Patent Laid-Open No. 90203/1987) or which has been supplied directly to a shaping mold in the form of fibers (Japanese Patent Laid-Open No. 259372/1985). These methods have almost solved the above-described problems resulting from the use of a mat for molding, but they involve a risk of producing a deviation of the shape of the outer periphery when a ligneous molding material is supplied into a shaping mold, so that a molded product must be formed so as to have a slightly larger configuration than the desired configuration depending upon the desired quality, and the external shape must be finally blanked, thereby disadvantageously increasing the number of manufacturing steps and, hence, lowering the yield. Furthermore, according to the above-described methods, since the bulk specific gravity of a molding material varies in accordance with the variation in the water content in the material chips, the disintegrating conditions of the chips, the dispersing conditions of a binder, etc., these methods also involve a risk of producing a surface blister due to the increase in generated gas or lack of air permeability, or a risk of producing lack of strength due to the lowering in the density, resulting in the instability of the quality of the molded product.

SUMMARY OF THE INVENTION

Accordingly, it is an object of the present invention to eliminate the above-described problems in the prior art and to provide a method of manufacturing a molded wooden product which greatly enhances the yield and productivity by dispensing with a step of mat-making and enabling the external shape of a molded product to be finished without the need for any special shaping step, and which eliminates problems during hot compression molding and stabilizes the quality by making the weight of the molding material uniform.

To achieve this aim, the present invention provides a method of manufacturing a molded wooden product comprising the steps of preparing a ligneous molding material by adding a binder consisting of a synthetic resin to wood fibers; adjusting the weight of the molding material in a fibrous state or in a state of being aggregated into a predetermined configuration; directly supplying the molding material to a shaping mold; shaping the outer periphery of the molding material by moving the shaping mold toward the center; and hot compression molding the molding material.

The wood fibers used in the present invention are obtained by disintegrating wood chips, etc. and the kind of wood to be used and the method of disintegrating wood chips are not restricted. For example, Japanese red pine (Pinus Densiflora), Japanese cedar (Cryptomeria Japonica), lauan (Genera Parshorea), Japanese beech (Fagus Crenatal) may be used as the wood, and a conventional method of digesting wood chips with steam and then mechanically disintegrating the digested wood chips may be used as a method of disintegrating the chips.

The binder added to the wood fibers may be of any type so long as it has a property for complementing the natural bindability of the wood fibers themselves. For example, a thermoplastic resin such as a cumarone resin, and a thermosetting resin such as a phenol resin and urea resin are usable. In addition to the binder, other additives such as a water-repelling agent for enhancing the water resistance and a mold release agent may also be added to the wood fibers.

In the present invention, it is preferable to adjust the weight of the ligneous molding material after removing the rich portion of the binder. In order to remove the rich portion of the binder from the ligneous molding material, for example, a method of preparing a vertical classifying container, by dropping the molding material from the upper portion of the container, and discharging the light portion of the molding material on a rising current of air in the course of dropping, while allowing the rich and heavy portion of the binder to drop to the lower portion of the container may be adopted.

The method according to the present invention includes compression molding a ligneous molding material supplied to a shaping mold in a fibrous state, as described above. In this case, for example, the upper mold and the lower mold which constitute a shaping mold are combined in advance with each other with a predetermined space therebetween, and the molding material is charged into the shaping mold on an air stream. On the other hand, in the case of supplying a molding material to a shaping mold in the form of a mass, for example, a molding material is sucked into a laminating container provided with a metal net, punched metal plate or the like so as to be accumulated on the metal net or the like. The deposited molding material is thereafter carried above the shaping mold while being sucked and held by a holder, and the suction is next released to drop the molding material into the shaping mold.

In order to adjust the weight of a molding material, in the case of supplying the molding material in a fibrous state, a weighing device is provided on the supply path, the molding material is continuously supplied to the weighing device, and the supply amount is adjusted with reference to the readout of the weighing device. In the case of supplying the molding material in the form of a mass of a predetermined configuration, the upper surface of the material mass is finished so as to be even, the weight of the material together with the container is weighed to calculate the thickness to be removed so as to obtain the preset weight, and the upper surface of the material mass is shaved off by that thickness.

According to a method of manufacturing a molded wooden product having the above-described structure, since a ligneous molding material is directly supplied to a shaping mold, the step of mat making is dispensed with, thereby enhancing the yield and simplifying the manufacturing process. Furthermore, since the shaping mold is moved toward the center for shaping the outer periphery of the molding material after the supply of the ligneous molding material, the subsequent step of blanking the external shape is obviated, thereby further enhancing the yield and simplifying the manufacturing process.

In addition, since the molding material is supplied after adjusting the weight of the material, it is possible to produce a molded product which is free from defects such as surface blister and has a stable strength.

The above and other objects, features and advantages of the present invention will become clear from the following description of the preferred embodiments thereof, taken in conjunction with the accompanying drawings.

BRIEF DESCRIPTION OF THE DRAWINGS

FIGS. 1 and 2 show an example of a manufacturing process for a molded wooden product according to the present invention, wherein FIG. 1 is a flowchart of preparation of a molding material, and FIG. 2 is a flowchart of molding the molding material shown in FIG. 1;

FIGS. 3 to 11 show the structure and an example of use of an apparatus for carrying out a method of manufacturing a molded wooden product according to the present invention, wherein FIG. 3 is a perspective view of a disintegrating machine;

FIG. 4 is a perspective view of a blender;

FIG. 5 schematically shows a classifying apparatus;

FIG. 6 is a sectional view of a mass-forming apparatus;

FIG. 7 schematically shows a shaving device;

FIGS. 8 and 9 are sectional views of a holder; and

FIGS. 10 and 11 are sectional views of a shaping mold; and

DESCRIPTION OF THE PREFERRED EMBODIMENTS

Embodiments of the present invention will be explained herein with reference to the accompanying drawings.

Figure 1:
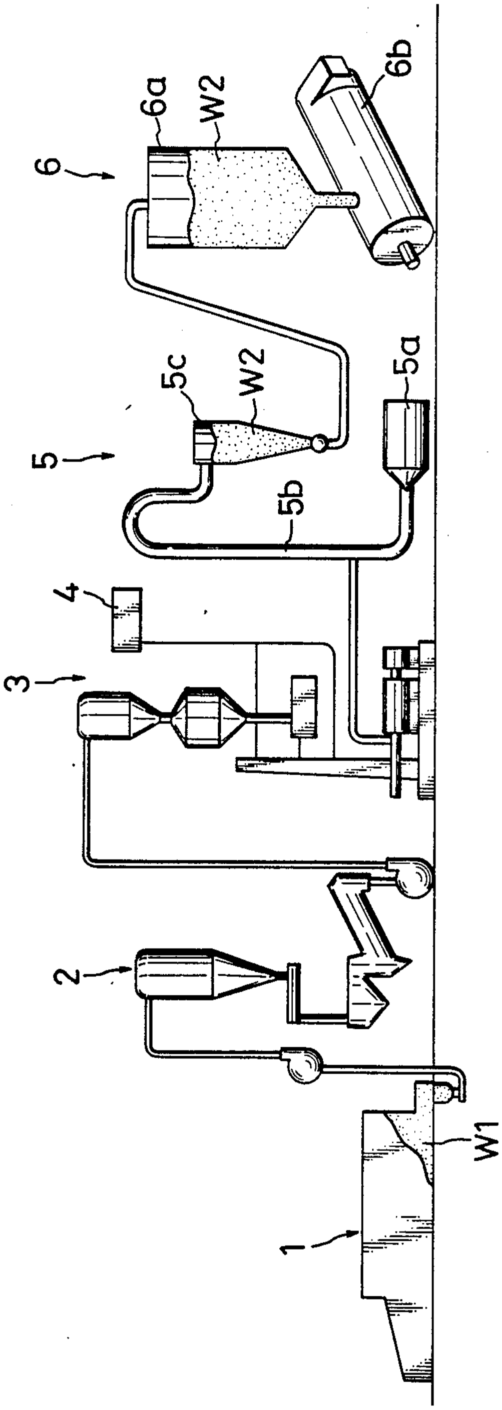
Figure 2:
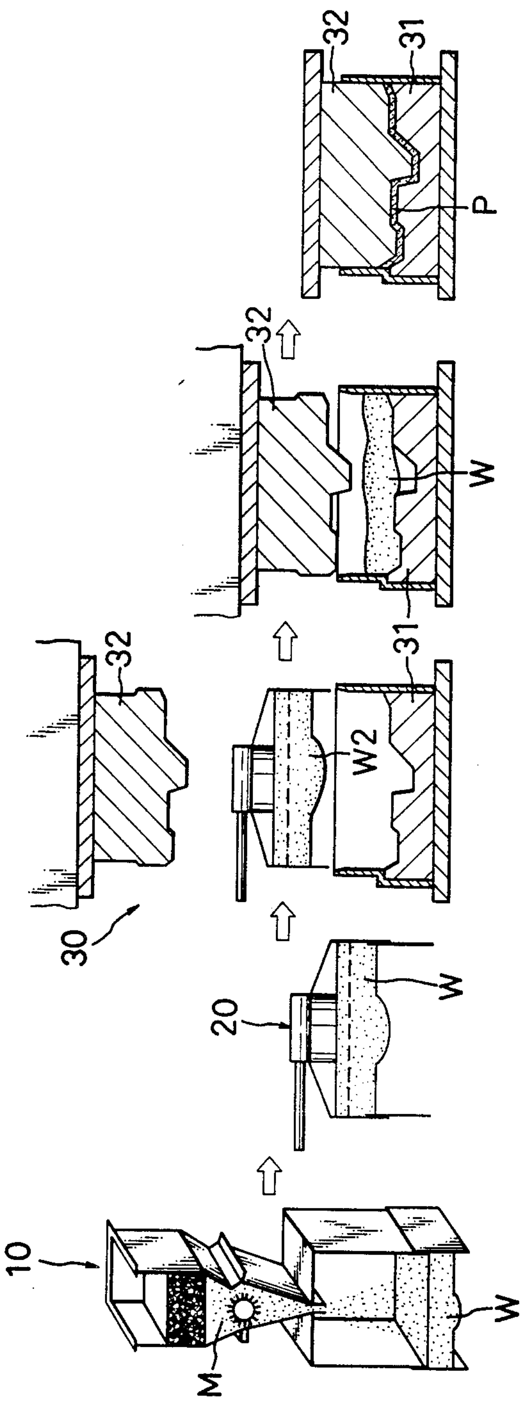

FIGS. 1 and 2 schematically show an example of a manufacturing process for a molded wooden product according to the present invention. In FIG. 1, the reference numeral 1 denotes a storing tank for storing wood chips W1. The wood chips W1 conveyed from the storing tank 1 are washed by a washing machine 2, and then carried to a disintegrating machine 3, which digests the wood chips W1 with steam and disintegrates the digested wood chips W1 into a fibrous state. At this time, a water-repelling agent is supplied from a pump 4 to the disintegrating machine 3. The disintegrated wood fibers W2 are dried while being conveyed through a hot-air tube *5b* of a drying machine 5 and carried to a cyclone *5c* on hot air which is supplied from a dryer *5a*. The dried wood fibers W2 are conveyed through a hopper *6a* to the main body *6b* of a blender 6, where the wood fibers W2 are mixed with a binder, a water-repelling agent, etc., and thereafter they are carried to the next step.

The fibrous mixture (ligneous molding material) M carried from the blender 6 is formed into a material mass W of a predetermined configuration by being accumulated from the above by a mass-forming apparatus 10, as shown in FIG. 2. The material mass W is thereafter transported to a molding apparatus 30 by means of a holder 20 and charged into a lower mold 31 of the molding apparatus 30. The material mass W charged into the lower mold 31 is heated and then compressed by a lowered upper mold 32 of the molding apparatus 30, to produce a molded product P of a predetermined configuration.

Each step of the above-described process will now be explained in detail with reference to other drawings.

Figure 3:
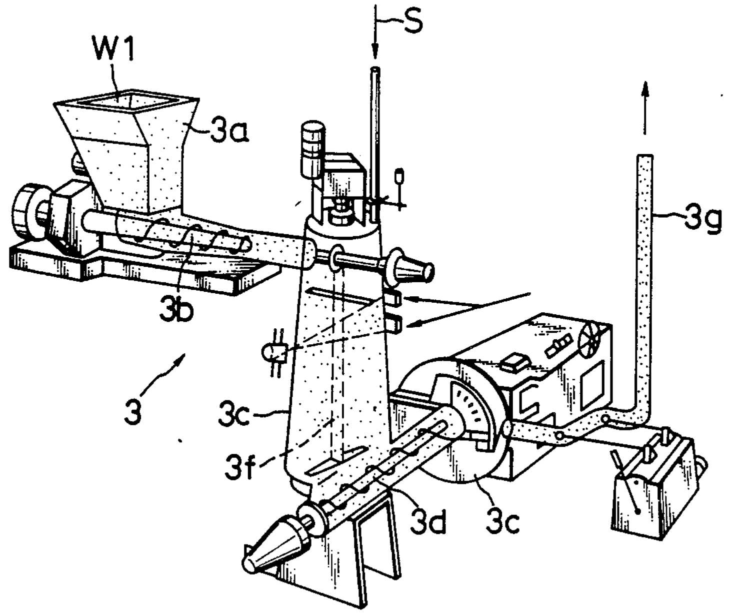

The disintegrating machine 3 is, as shown in FIG. 3, provided with a hopper *3a* for temporarily storing the wood chips W1 conveyed from the chip washing machine 2 (FIG. 1), a first screw feeder *3b* provided under the hopper *3a* for feeding a constant amount of wood chips W1, a digesting tank *3c* for digesting the wood chips W1 supplied from the first screw feeder *3b* with steam, a second screw feeder *3d* provided under the digesting tank *3c* for feeding a constant amount of wood chips W1, and a splitting disc *3e* for mechanically disintegrating the wood chips W1 supplied from the second screw feeder *3d*.

Steam S is supplied from above the digesting tank *3c*, and the wood chips W1 supplied into the digesting tank 3c are steamed while being stirred by a stirring rod 3f and rendered readily disintegrable. The thus-digested wood chips W1 are conveyed to the splitting disc 3e by the second screw feeder 3d, and after they are mechanically disintegrated by the splitting disc 3e, they are conveyed to the drying machine 5 (FIG. 1) through a pressure duct 3g.

The main body 6b of the blender 6 has agitating blades 6d rotatably provided in a cylindrical case 6c. An inlet 6g for receiving the wood fibers W2 from the hopper 6a (FIG. 1) and spray nozzles 6e for supplying a binder such as a phenol resin or a water-repelling agent such as paraffin are provided at one end of the case 6c, and an outlet 6f for discharging the mixture M (FIG. 2) is provided at the other end of the case 6c.

Thus, the wood fibers W2 introduced from the inlet 6g to one end of the case 6c are combined with the binder, water-repelling agent, etc. which are supplied from the spray nozzles 6e, thoroughly blended with the agitating blades 6d which are rotated by a driving means (not shown), and subsequently moved to the side of the outlet 6f to be discharged and conveyed to the following molding step.

Figure 5:
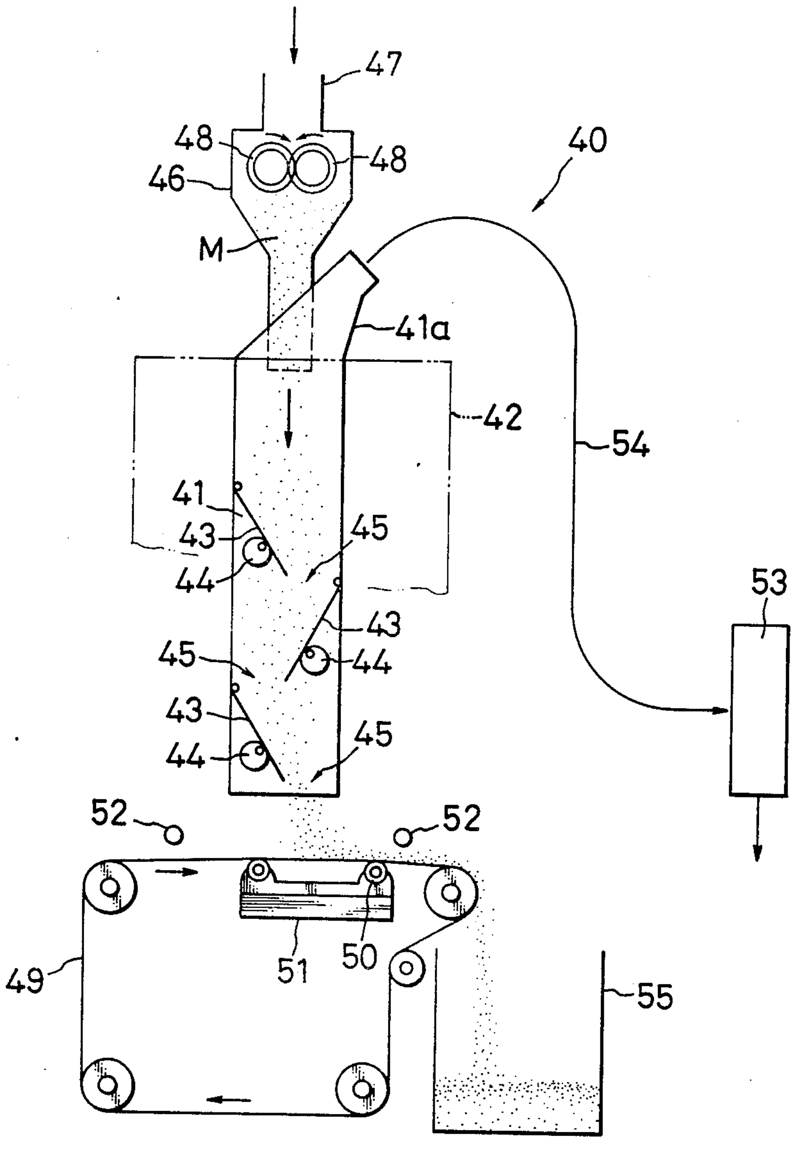

The mixture M conveyed from the blender 6 is charged into a classifying apparatus 40 shown in FIG. 5. In FIG. 5, the reference numeral 41 represents a vertical classifying container fixed on a trestle 42 with the lower end open and the upper end integrally provided with a discharging duct 41a which is inclined upwardly. In the interior of the classifying container 41, a plurality of classifying plates 43 are rockably provided in vertically alternately different directions. The free end of each of the classifying plates 43 is supported by an eccentric cam 44 which is rotatably provided in the classifying container 41, so that an appropriate angle of inclination of the classifying plate 43 is formed by the rotation of the eccentric cam 44. In other words, the classifying plate 43 thus maintains the inclined state by being supported by the eccentric cam 44, thereby forming a classifying portion 45 having a predetermined opening between the classifying plate 45 and the opposite inner wall of the classifying container 41.

Figure 4:
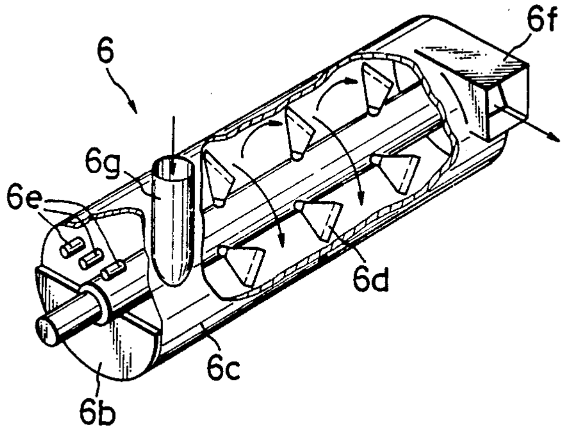

A fluffer case 46 is connected to the upper end of the classifying container 42 so as to communicate therewith. The fluffer case 46 is integrally provided at the upper end thereof with an opening 47 for receiving the mixture M supplied from the blender 6 (FIGS. 1 and 4), and in the interior thereof with a pair of fluffer rolls 48 which intermesh with each other. The fluffer rolls 48 loosen the interlocking of the fibers of the mixture M. The mixture M charged from the opening 47 and loosened by the fluffer rolls 48 is dropped into the classifying container 41.

A conveyor 49 for receiving the mixture M which drops from the classifying container 41 is disposed below the classifying container 41. The conveyor 49 is supported under the classifying container 41 by a supporting member 51 having supporting rollers 50 so as to stably receiving the dropping mixture M. Above the conveyor 49 a height sensor 52 (e.g., phototube) is disposed. The height sensor 52 quantitatively measures the mixture M dropping from the classifying container 41.

A suction unit 53 with a built-in suction fan is connected to the discharging duct 41a of the classifying container 41 through a suction pipe 54 so that the classifying container 41 is evacuated. An accommodating case 55 for accommodating the mixture M is attached to the conveyor 49.

In the classifying apparatus 40 having the above-described structure, the mixture M conveyed from the blender 6 in the preceding step and charged from the opening 47 of the fluffer case 46 is loosened by the fluffer rolls 48, and thereafter dropped into the classifying container 41. During this time, a rising current of air is generated by the operation of the suction fan of the suction unit 53, and a light mixture containing an appropriate amount of binder is blown up on the rising current of air and is sucked by the suction unit 53 through the discharging duct 41a and the suction pipe 54 while the dropped mixture M is passing through the classifying portions 45 defined by the classifying plates 43. On the other hand, since the rich portion of the binder in the mixture M is heavy, it gradually moves to the lower portion of the classifying container 41, until it drops onto the conveyor 49 from the opening at the lower end and is conveyed by the conveyor 49 to the accommodating container 55. The mixture introduced to the suction unit 53 is carried out to a mass-forming apparatus 10 (FIG. 2).

In this way, the rich portion of the binder is removed from the mixture M and only wood fibers containing the binder almost uniformly are carried out to the next step. It is possible to adjust the classifying level at this time as desired by the area of the opening of the classifying portion 45 (the angle of inclination of the classifying plate 43) or the suction power of the suction unit 53. In this case, the adjusting amount is determined with reference to the amount of rich portion of the binder obtained by the height sensor 52.

Figure 6:
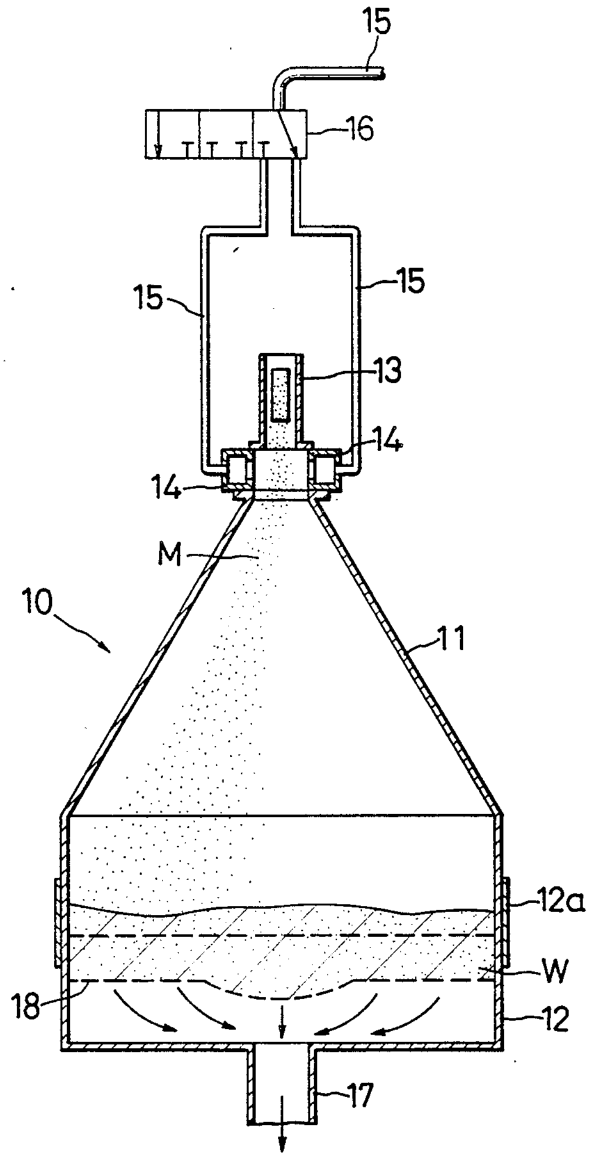

The mass-forming apparatus 10 for obtaining the material mass W from the mixture M has the structure, for example, shown in FIG. 6. The mass-forming apparatus 10 is substantially composed of a spraying container 11 consisting of roof-shaped iron plates or the like and a laminating container 12 combined with the lower side of the spraying container 11 so as to accumulate the mixture M therein. At the upper opening of the spraying container 11 a sprayer 13 for spraying the mixture M and air-jetting containers 14 having air-jetting orifices for regulating the spraying direction of the mixture M at the inside thereof are provided. Air switched by a switching valve 16 is supplied to each of the air-jetting containers 14 through an air supply pipe 15. A vacuum duct 17 for evacuating the interior of the laminating container 12 is connected to the bottom side of the laminating container 12, and a form-imparting member such as a metal net and a punched metal plate for regulating the configuration of the bottom surface of the material mass is stretched above the vacuum duct 17. Guide plates 12a for fitting the spraying container 11 into the laminating container 12 are integrally provided with the laminating container 12. The lower portion of the laminating container 12 including the vacuum duct 17 can be separated from the upper portion thereof.

In this structure, the switching valve 16 is first opened to supply air from the air supply pipe 15 to the air-jetting container 14, thereby forming the air flow leading from the spraying container 11 to the laminating container 12. The mixture M is then released from the sprayer 13 to the air flow. The mixture M floats on the air and falls down and subsequently accumulates on the form-imparting member 18 in the laminating container 12. At this time, the air jetted from the right and left air-jetting containers 14 is switched by the switching valve 16 so as to change the direction in which the mixture M falls down, thereby scattering the mixture M in the entire part of the form-imparting member 18 and depositing it in a thick depth at a necessary portion. Simultaneously, the air is sucked from the bottom side of the laminating container 12 through the vacuum duct 17 to accelerate the deposition of the mixture M.

In this manner, the accumulation of the mixture M proceeds, and finally the material mass W of a predetermined configuration is obtained. At this point, the supply of the mixture M from the sprayer 13 is stopped, and the air supply from the air supply pipe 15 is simultaneously stopped, thereby finishing the step of the accumulation of the wood fibers. The thus-obtained material mass W has a very low density, because it is merely accumulated, and is set to have a larger thickness than is desired.

Figure 7:
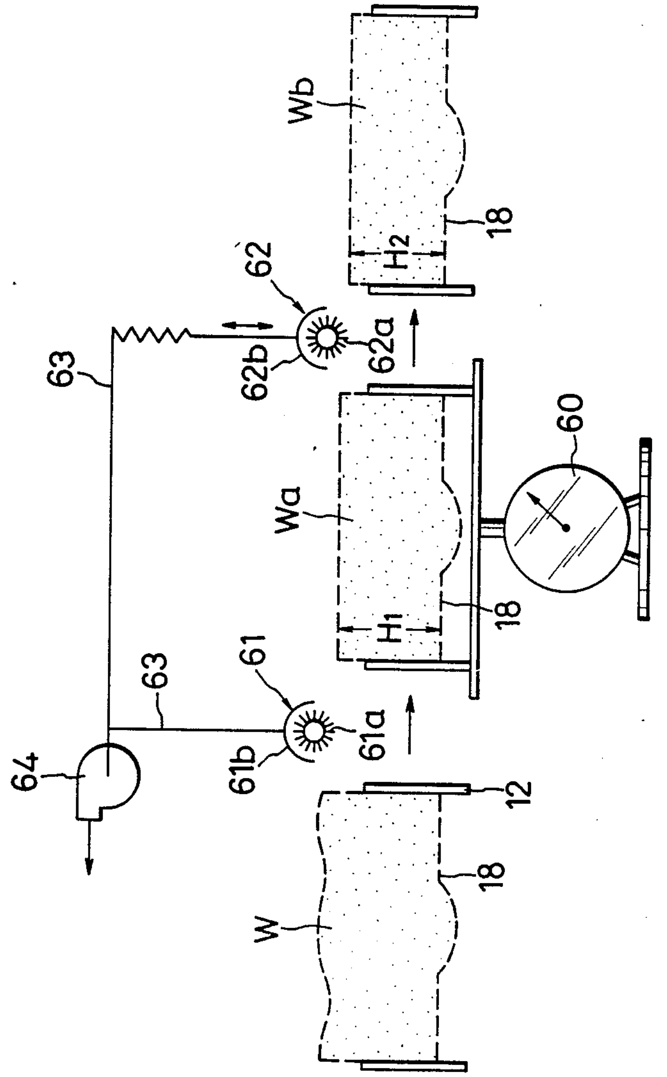

After the completion of the accumulation, the laminating container 12 is separated from both the spraying container 11 and the lower portion of the laminating container 11, to be moved to the shaving step shown in FIG. 7. In the shaving step, a weighing device 60 is provided in a fixed state, and a fixed shaving device 61 and a movable shaving device 62 which is vertically movable are disposed on both sides above the weighing device 60. The shaving devices 61 and 62 are provided with rotary blades **61*a* and 62*a*, respectively, and covers 61*b* and 62*b*, respectively for covering the upper portion of the rotary blades 61*a* and 62*a*, respectively. A suction fan 64 is connected to each of the covers 61*b* and 62*b* through a suction pipe 63**.

While the laminating container 12 is horizontally moved, the upper surface of the material mass W is first shaved by a predetermined amount (predetermined height) by the fixed shaving device 61 and finished so as to be even, and the weight of the remaining material mass Wa is subsequently measured by the weighing device 60. The amount (height) of material mass to be shaved off in order to obtain the preset weight is calculated by the following formula on the basis of the measured value:

$$\Delta H = H1 - H2 = \frac{H1}{A1}(A1 - A2)$$

wherein

ΔH : th height of the material mass Wb to be shaved off by the movable shaving device 62

H1 : the height of the material mass Wa

H2 : the height of the material mass Wb

A2 : the weight of the material mass Wa

A1 : the preset weight

The laminating container 12 is again moved to subject the mass material Wa to another shaving by means of the movable shaving device 62, thereby obtaining a material mass Wb of a predetermined thickness.

In this way, it is possible to constantly obtain a ligneous molding material of a predetermined weight merely by horizontally moving the laminating container 12, even if the bulk specific gravity of the mixture M is changed due to a change in water content of the wood chips W1 or the disintegrating conditions of the disintegrating machine 3.

Figure 8:
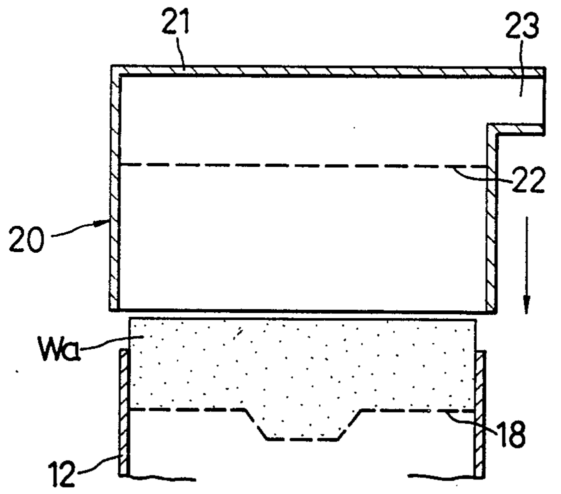
Figure 9:
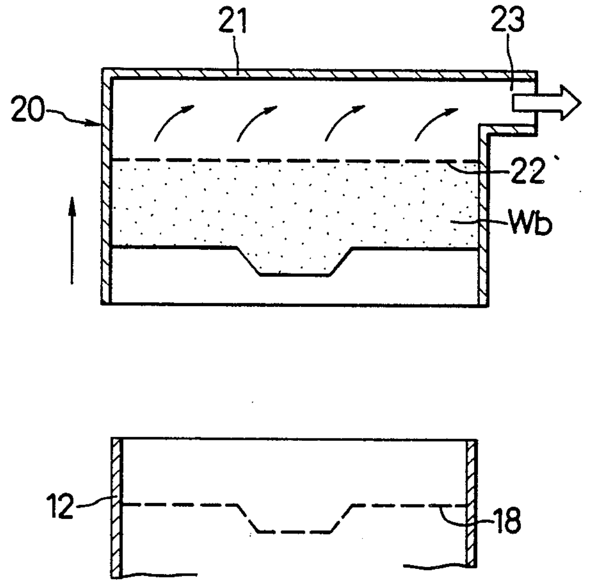

The mass material Wb obtained in the above-described manner is next shifted from the laminating container 12 to a holder 20, as shown in FIGS. 8 and 9. The holder 20 is composed of a main body 21 having a configuration which enables the laminating container 12 to fit thereinto, a stretched supporting member 22 such as a metal net, and a vacuum duct 23 connected to the upper side of the main body 21. When the inside of the main body is sucked by a suction device (not shown) through the vacuum duct 23, since the material mass W is light, it moves upward and is supported by the supporting member 22 in close contact therewith. After the holder 20 is lifted, moved to the molding apparatus 30 and positioned by a conveyor means (not shown) while the suction state is maintained, the suction is released to charge the material mass Wb into the lower mold 31 (FIG. 2).

Figure 10:
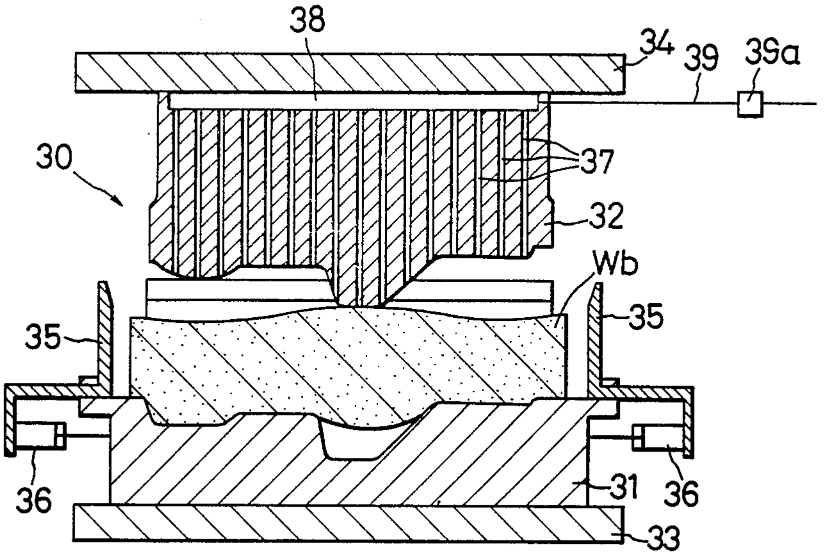
Figure 11:
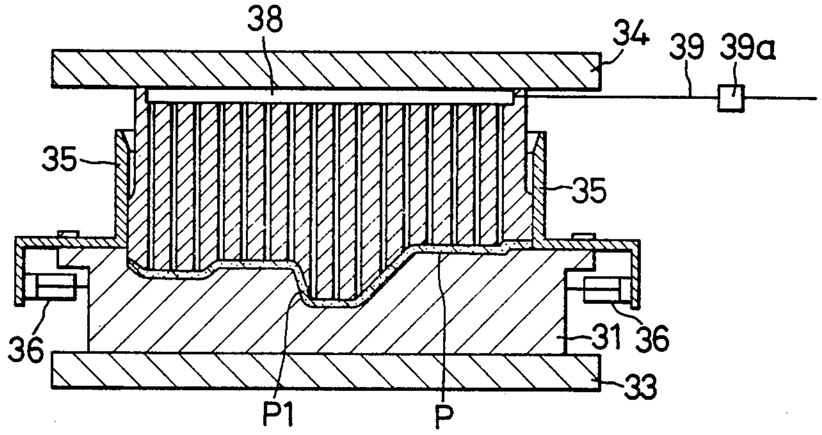

FIGS. 10 and 11 show the structure and an example of use of the molding apparatus for carrying out the compression molding of the material mass Wb charged in the above-described manner. In FIGS. 10 and 11, the lower mold 31 is fixed on a hot plate 33, and the upper mold 32 is fixed on the under surface of a hot plate 34. The outer periphery of the lower mold 31 is surrounded by a holding frame 35, and a space for accommodating the material mass Wb is formed on the lower mold 31. The holding frame 35 is divided into four members in correspondence with the four sides surrounding the lower mold 31, each member being provided on the lower mold 31 so as to be movable and relatively advanced and withdrawn by a cylinder 36 attached to the lower mold 31. A plurality of gas vents 37 are provided on the upper mold 32. The gas vents 37 are connected to an evacuating means (not shown) through a pipe 39. A switch valve **39*a* is provided on the pipe 39**.

In the molding apparatus 30 having the above-described structure, the lower mold 31 and the upper mold 32 are heated by the hot plates 33 and 34, respectively, prior to compression molding and each member of the holding frame 35 is relatively withdrawn by the operation of the cylinders 36 to supply the material mass Wb onto the lower mold surrounded by the holding frame 35 (FIG. 10). When the material mass Wb is supplied, the holding frame 35 is first relatively advanced (moved toward the center) by the operation of the cylinders 36 so as to shape the outer periphery of the material mass Wb. An upper press ram (not shown) is next lowered to compress the material mass Wb between the upper mold 32 and the lower mold 31. During this time, the switch valve 39 is opened to degas the molding apparatus 30 through the gas vents 36. The compression gradually increases the interlocking of the wood fibers and, hence, the density of the wood fibers becomes higher. Together with this, the molding pressure is raised, and finally a uniform molded wooden product P having a hard and predetermined deep drawn portion P1 is obtained. In particular, the outer periphery of the molded product P is finished with a predetermined configuration and a high density because the holding frame 35 has been moved at the beginning in conformity with the final external shape of the molded product P. Thus, a molded product excellent in accuracy and strength is obtained.

In addition, since the rich portion of the binder is removed from the material mass Wb in advance in the classification step, and the weight is adjusted in the shaving step, a molded product P which has a stable quality without a defect such as a surface blister is obtained.

In this embodiment, a material mass W of a low density is used as a ligneous molding material, but the present invention enables the fibrous mixture M itself, which is a material of the material mass W, to be supplied to the shaping mold for compression molding.

Figure 12:
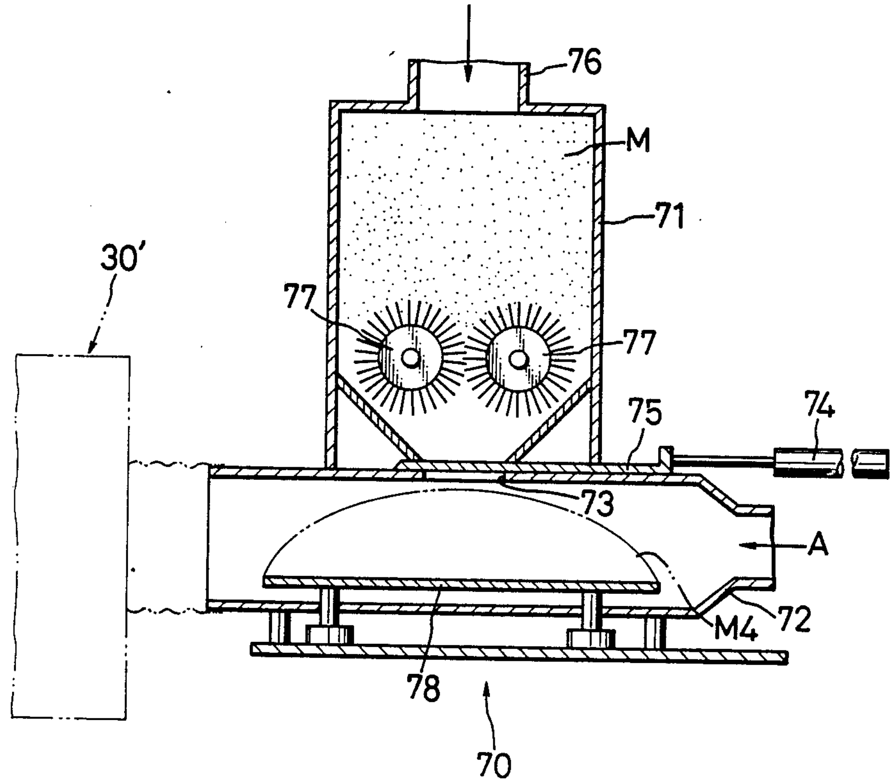
FIG. 12 is a sectional view of another example of an apparatus (filler device) for manufacturing a molded wooden product.

FIG. 12 shows an example of an apparatus for directly supplying the mixture M to the shaping mold. In FIG. 12, the reference numeral 70 represents a filler device. The filler device 70 is substantially composed of a feeding container 71 and a longitudinal pressure container 72. The feeding container 71 and the pressure container 72 are linked with each other via an opening 73 which is opened and closed by a masking plate 75 driven by a cylinder 74. The feeding container 71 is provided at the upper end thereof with a feeding hole 76 for receiving the mixture M, and above the opening 73 with a pair of built-in brush wheels. One end of the pressure container 72 is connected to a fan (not shown) and the other end to a molding apparatus 30′ for compression molding similar to the molding apparatus 30 shown in FIGS. 10 and 11. The pressure container has a built-in weighing plate 78 connected to a load cell (not shown) at a position below the opening 73.

The molding apparatus 30′ connected to the filler container 40 basically has the same structure as the molding apparatus 30 shown in FIGS. 8 and 9, and is further provided with a window on the holding frame 35. The mixture M is directly supplied from the pressure container 72 of the filler device 70 to the half-closed shaping mold through the window.

In the molding apparatus 30′ having the above-described structure, the mixture M supplied from the feeding hole 76 to the feeding container 71 is dropped from the opening 73 with the interlocking of the fibers being loosened by the brush wheels 77, and accumulates onto the weighing plate 78. Simultaneously, air is blown from the fan in the direction indicated by the arrow A, and the mixture M which has accumulated on the weighing plate 78 is fed to the molding apparatus 30′ on the air stream.

The mixture M fed to the mold is first subjected to shaping of the outer periphery by relatively advancing the holding frame 35 in the same way as explained with reference to FIGS. 10 and 11, and the upper mold 32 is lowered for compression to obtain a molded wooden product P of a high quality in the same way as in the former embodiment.

Additionally, it goes without saying that the apparatus and devices used in manufacturing the molded wooden products are only examples, and may be replaced by the apparatus and devices having other structures.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A method of manufacturing a molded wooden product comprising the steps of:
   - preparing a ligneous molding material by adding a binder consisting essentially of a synthetic resin to wood fibers;
   - removing a portion of said ligneous molding material that is rich in binder;
   - adjusting the weight of said molding material in a fibrous state or in a state of being aggregated into a predetermined configuration by evenly shaving an upper surface of said molding material, weighing the remaining material mass, calculating the amount of remaining material mass to be shaved off on the basis of the result of said weighing to obtain a preset weight, and shaving said remaining mass again by the calculated amount; and
   - hot compression molding said molding material.

2. A manufacturing method as set forth in claim 1, wherein the portion of said ligneous molding material rich in binder is removed by utilizing the difference in weight.

3. A manufacturing method as set forth in either of claim 1 and 2, wherein the portion of said ligneous molding material rich in binder is separated downwardly by dropping said molding material from a classifying apparatus, and taking out a portion of said ligneous molding material poor in binder on a rising current of air.

* * * * *